March 26, 1935.  H. GOLDBERG  1,995,421
FLEXIBLE SHAFT
Filed March 3, 1932  2 Sheets-Sheet 1
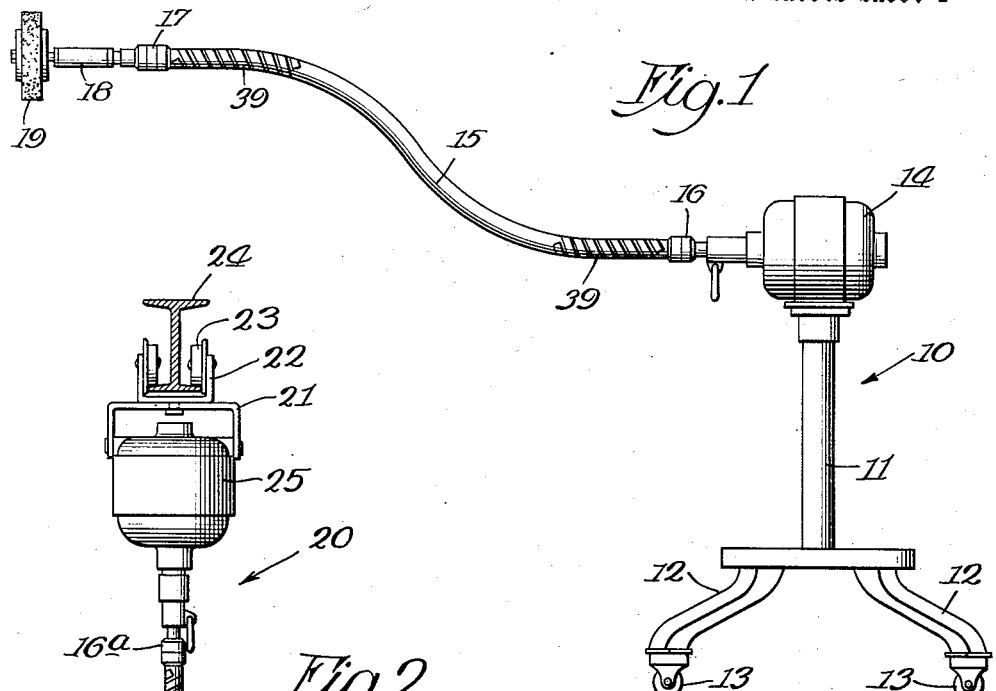
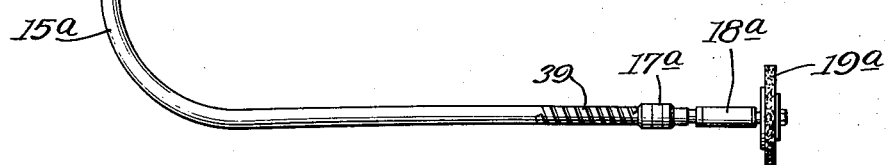
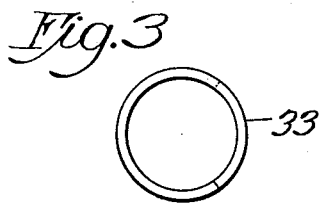
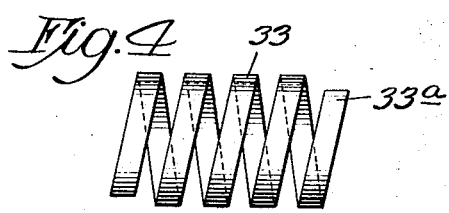
Inventor
Herman Goldberg
By Rector, Hibben, Davis & Macauley Attys.

March 26, 1935.                H. GOLDBERG                1,995,421
                                FLEXIBLE SHAFT
                            Filed March 3, 1932            2 Sheets-Sheet 2
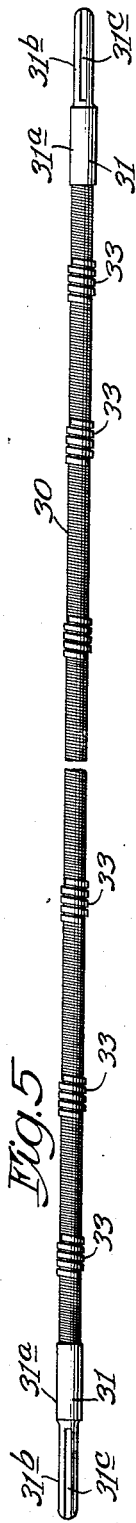
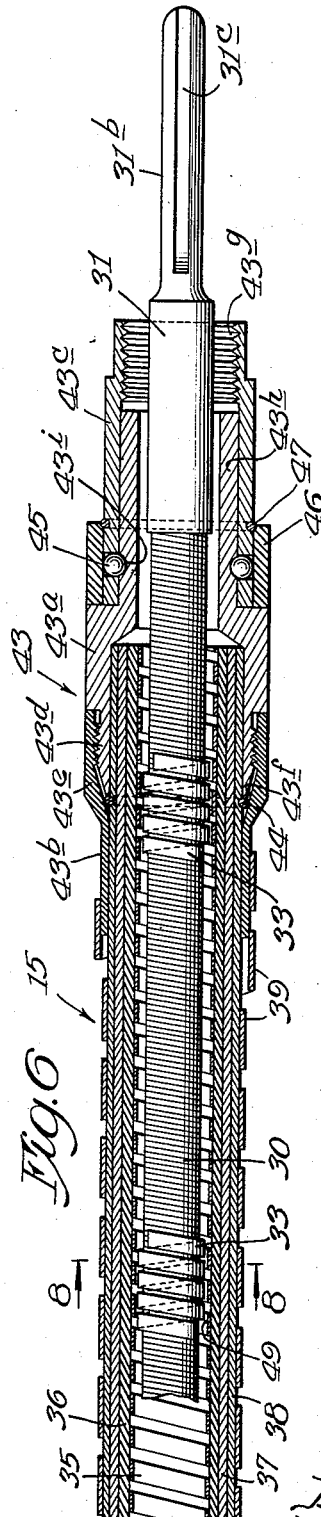
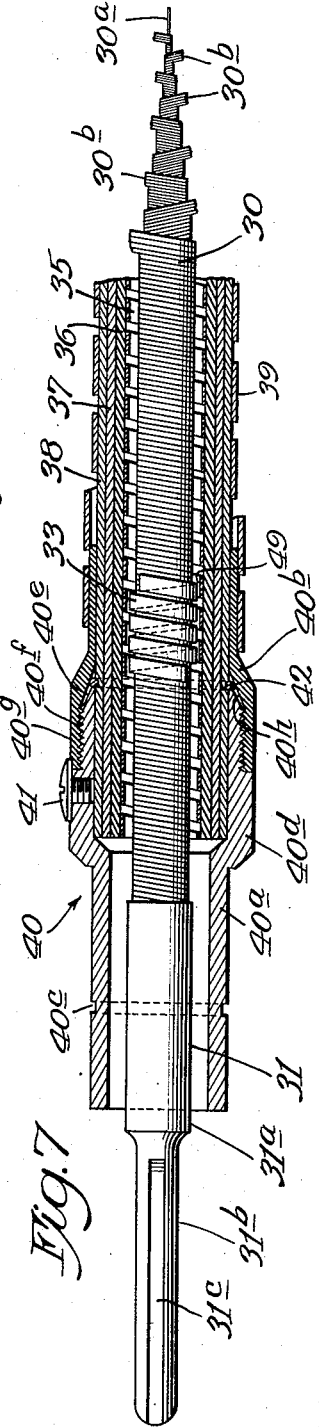
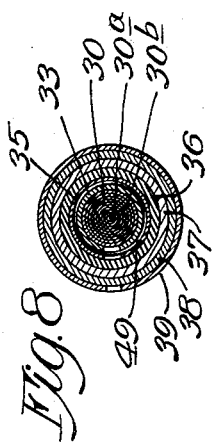
Inventor
Herman Goldberg
By Rector, Hibben, Davis & Macauley Attys.

Patented Mar. 26, 1935

1,995,421

UNITED STATES PATENT OFFICE 1,995,421

FLEXIBLE SHAFT

Herman Goldberg, Chicago, Ill.

Application March 3, 1932, Serial No. 596,445

17 Claims. (Cl. 64—30)

This invention relates to improvements in flexible shafting of the type which comprises a flexible casing surrounding a flexible core or shaft by which power is transmitted from one end of the shaft to the other. Flexible shafting of this kind is often subject to more or less severe bending when in use and this causes the core or shafting to bear against the inner surface of the casing on the outer sides of the bend with the result that great heat and vibration are developed, that both the casing and the core wear rapidly at these points and have to be replaced at frequent intervals, and that high speed operation has not been possible for long periods of time. Efforts have heretofore been made to solve these difficulties by providing tubular bearings for the inner core or shaft at intervals but these bearings have been in the form of straight sleeves which have imparted such rigidity to the core or shaft as to interfere with its flexibility and they have so increased the friction between the core and casing that great friction and heat have been developed, resulting in the rapid deterioration of the parts and the slowing up of the speed of operation of the shaft.

The principal object of the present invention is to provide flexible shafting of an improved form comprising an outer casing with a flexible inner core or shaft which is provided with members adapted to serve as bearings between the core and the casing at the points where bending occurs so that the wear upon the core and casing is minimized, thereby greatly increasing the life, efficiency and speed of operation of the shaft. A further object of the invention is to provide improved flexible shafting comprising a flexible casing and a flexible core or shaft provided at intervals with flexible bearings which are adapted to engage the casing and to conform to the curvature of the casing and core so that the free bending of the shafting is not prevented and the liability of vibration and excessive wear is overcome. Still another object of the invention is to provide an improved flexible shaft or core provided with a bearing adapted to engage a surrounding casing and constructed in the form of a helix which may bend to conform to the lengthwise curvature of the shaft. Still another object of the invention is to provide a flexible shaft provided with spaced bearings each constructed in the form of a helix and held in place by its frictional grip upon the shaft, whereby the spaced relation of the several bearings may be readily adjusted. Still another object of the invention is to provide improved flexible shafting comprising a flexible core and an inner flexible shaft or core which is provided at intervals with flexible surrounding bearings spaced from the inner surface of the casing but adapted to contact therewith at points where the bending of the shafting occurs. Other objects relate to various features of construction and arrangement which will appear more fully hereinafter.

The nature of the invention will be understood from the following specification taken with the accompanying drawings, in which one embodiment is illustrated. In the drawings, Fig. 1 shows a side elevation of one form of machine equipped with the flexible shafting of the present invention;

Fig. 2 shows a side elevation of another form of machine equipped with the flexible shafting of the present invention;

Fig. 3 shows an end elevation of one of the improved bearing members which are mounted upon the inner core or shaft;

Fig. 4 shows a side elevation of the bearing member illustrated in Fig. 3;

Fig. 5 shows a side elevation of the improved inner core or shaft of the flexible shafting with an intermediate portion thereof broken away, showing a number of the improved bearing members spaced apart;

Fig. 6 shows an enlarged longitudinal section through the lower portion of the casing of the improved shafting and its fitting, illustrating the inner core or shaft in elevation;

Fig. 7 shows a similar longitudinal axial section taken through the upper end of the casing and its fitting with the core or shaft in elevation; and Fig. 8 shows a transverse section taken on the line 8—8 of Fig. 6.

The extent to which flexible shafting is bent when in use depends largely on the method of mounting the shafting and the type of machine with which it is used and these considerations may influence the determination of the number and distribution of the flexible bearing members which are required upon the inner core or shaft. In Fig. 1 there has been illustrated a grinding machine 10 of the pedestal type comprising a standard 11 carried by legs 12 which are provided with rollers 13 adapted to travel upon a floor or other support. The standard 11 is provided at its upper end with an electric motor 14 which is arranged with its shaft extending horizontally and which is adapted to operate a grinding tool through flexible shafting 15 which is connected thereto through a fiting 16 and which is provided at its other end with a fitting 17 making connection with the handle 18 of the grinding tool which, in this instance, is provided with a grinding wheel 19. When the flexible shafting 15 is mounted in this way, it is subject to more or less severe bending throughout its length, thus causing the danger of wear at various points by reason of the contact of the inner core or shaft with the outer casing and the application of the present invention to flexible shafting employed with this kind of machine would therefore ordinarily require the distribution of the improved bearing members throughout the length of the inner core or shaft.

On the other hand, there is illustrated in Fig. 2 a grinding machine 20 of the overhead trolley type comprising a bracket 21 which is carried by a hanger 22 provided with rollers 23 which travel upon the overhead trolley or track 24. The bracket 21 supports the electric motor 25 which is mounted with its shaft extending vertically. In this case, the shaft of the motor is connected through a fitting 16$^a$ with the flexible shafting 15$^a$ and the other end of this shafting is connected, as before, through another fitting 17$^a$ with the handle 18$^a$ of a grinding tool equipped with a grinding or polishing wheel 19$^a$. The flexible shafting 15$^a$ may be in all respects like the flexible shafting 15 and the fittings may be the same, but, in the case of the arrangement shown in Fig. 2, the flexible shafting, being suspended from above, is ordinarily not subjected to severe bending except at its lower end so that it may be unnecessary to provide the inner core or shaft with the improved bearings of the present invention except at the lower end in the region of the grinding tool which is manipulated by the workman in a grinding or polishing operation.

The improved flexible shaft or core 30 is illustrated more particularly in Figs. 5, 6 and 7, and is made up by winding a plurality of series of wires upon a central wire core. All of the wires are preferably high carbon steel piano wires and, as shown in Fig. 7, the central core 30$^a$ has wound about it a plurality of series of wires 30$^b$ arranged with the wires of each series inclined in helical fashion in a direction opposite to the inclination of the wires of the next preceding series. The outermost series of wires is inclined in such a direction that the rotation of the shaft will tend to wind this outer layer still tighter and thus increase its grip upon the inner layers. Thus, shafts intended to rotate in opposite directions have their outer layers of wires oppositely inclined. The body of the shaft 30 has secured to the ends thereof two tips or terminals 31 which, in this instance, are illustrated as being alike at both ends of the shaft. Each terminal comprises a cylindrical portion 31$^a$ having a projection 31$^b$ of smaller diameter provided with a longitudinal groove 31$^c$. The parts 31$^b$ are adapted to be connected to the motor and to the grinding tool at opposite ends of the shaft and the groove 31$^c$ is provided to permit an interlocking driving connection to be made. The shaft 30 is provided with a plurality of bearing members 33 which are preferably in the form of helical springs each made up of a flat steel member 33$^a$ arranged in helical form with an inner diameter slightly less than that of the outer diameter of the body of a flexible shaft 30 so that the bearing member has to be expanded slightly in order to place it upon the shaft, whereupon it contracts and grips the shaft with sufficient pressure to maintain itself in place during the ordinary rotation of the shaft within its casing. The direction of inclination of the convolutions of the helix making up each bearing member 33 is the same as that of the outer layer of wires forming the shaft so that any pressure encountered by a bearing member during the rotation of the shaft will tend to increase the grip of the bearing member upon the shaft. The length of each bearing member and the spaced relation of adjacent bearing members upon the shaft will depend upon the usage to which the shaft is to be put but each bearing member preferably has a length somewhat greater than its outer diameter and, in general, they are spaced with sufficient frequency that they will prevent the body of the shaft 30 from coming into contact with the inner surface of the surrounding casing when the shaft is in use.

One form of construction of the outer casing and the arrangement therein of the flexible shaft described above are illustrated particularly in Figs. 6, 7 and 8, where the casing 15, or 15$^a$, comprises an inner metal spring 35 formed preferably of a resilient round edge flat wire which is wound in helical fashion to form a continuous tubular member extending from one end of the casing to the other. Around this helical spring 35, there is applied a layer of oil proof rubber 36 or the like having embodied therein or applied thereto one or more layers of fabric sheeting. Around this rubber layer 36 there is applied a layer 37 of wire braiding which is applied under tension to the layers contained within it. On the outer side of the layer of wire braiding 37 is a layer 38 of rubber which forms the outer surface of the casing. This rubber may be reenforced by fabric or the like to give it greater strength. At the ends of the casing, the outer rubber layer 38 is protected by a helical metal guard 39. These guards are formed of flat resilient metal arranged in helical fashion and they are adapted to prevent excessive bending of the flexible shafting adjacent to the motor and adjacent to the tool being operated thereby. The casing thus built up is adapted to be connected to the motor casing and to the handle of the tool by suitable fittings.

The fitting 40 at the upper or motor end of the shaft is shown particularly in Fig. 7, and it comprises two sleeves 40$^a$ and 40$^b$ which have a telescoping threaded engagement with each other. The sleeve 40$^a$ is adapted to fit within the hub of the motor casing where it is clamped in place by suitable clamping means engaging the annular groove 40$^c$ therein. The other end of this sleeve 40$^c$ is enlarged as shown at 40$^d$ to receive the end of the casing 15. A set screw 41 passes through the fitting and overlaps the sleeve 40$^b$ to lock it against rotation. A connection between the casing and the fitting is established primarily by a split ring 42 which surrounds the casing in direct contact with the outer rubber layer 38 thereof adjacent to the inclined end face 40$^e$ of the sleeve 40$^a$. The threaded portion 40$^f$ of the sleeve 40$^a$ is engaged by the internally threaded enlarged portion 40$^g$ of the sleeve 40$^b$, the body portion of which closely fits the outer surface of the casing and is gripped on the outer side thereof by the end portion of the helical guard 39. The sleeve 40$^b$ is provided with an internal annular inclined surface 40$^h$ which engages the split ring 42 when the two sleeves are screwed together, thereby forcing the split ring inwardly and causing it to embed itself in the rubber layer of the casing so that the fitting is securely attached thereto. This form of fitting and that employed at the other end of the casing are described and claimed in my co-pending application, Serial No. 545,893, filed June 22, 1931.

The fitting 43 at the other end of the casing adjacent to the grinding or polishing tool is shown particularly in Fig. 6. It comprises two telescoping sleeves 43$^a$ and 43$^b$ which have a threaded engagement with each other and also a tubular extension 43$^c$ rotatably mounted on the sleeve 43$^a$. The sleeve 43$^a$ fits over the end of the casing 15 and is provided with a threaded portion 43$^d$ of reduced diameter which is engaged by the internally threaded enlarged end 43$^e$ of the other sleeve 43$^b$. The sleeve 43$^b$ has a reduced portion which closely fits the outer surface of the casing 15 and is engaged on its outer side by the end of the adjacent helical guard 39 which is expanded at this point to engage and grip the end of the fitting. A split ring 44 engages the outer rubber layer 38 of the casing at the end of the sleeve 43$^a$ and this split ring coacts with the inner annular inclined surface 43$^f$ formed on the sleeve 43$^b$ so that when the two sleeves are screwed together, the split ring is caused to embed itself in the outer layer of the casing wall and thus secure the fitting in place on the casing. In order that the handle of the tool may rotate freely with respect to the end of the casing, the tubular extension 43$^c$ of the fitting, which is internally threaded at 43$^g$ for connection with the handle of the grinding or polishing tool, is rotatably mounted upon the reduced end portion 43$^h$ of the sleeve 43$^a$. This tubular extension 43$^c$ is provided with a series of holes in which are mounted spherical balls 45 adapted to engage an annular groove 43$^i$ formed in the sleeve extension 43$^h$. A collar 46 surrounds the part 43$^c$ to maintain the balls 45 in engagement with the annular groove 43$^i$ and this collar is detachably held in place by a split ring 47 which coacts with the end thereof and engages an annular groove in the outer surface of the part 43$^c$.

The outer diameters of the end fittings 31 of the shaft 30 and of the helical bearing members 33 are such that the shaft may be inserted freely through the casing 15, leaving a slight clearance 49 between the bearing members 33 and the inner annular surface of the metal spring 35 when the shaft is in its normal position with respect to the casing, as when the shaft and casing are suspended vertically with no bends therein. The amount of this clearance may, of course, vary with the size of the shaft and the uses to which it is to be put but, for illustration, in the case of a shaft having an external diameter of seven-sixteenths of an inch and a casing having an internal diameter of nine-sixteenths of an inch, the clearance between the outer surface of the bearing member 33 and the adjacent inner surface of the casing lining 35 may be from one sixty-fourth to one thirty-second of an inch. This clearance will prevent anything more than slight or momentary contacts of the shaft with the casing lining when the parts are suspended vertically but when the shaft is bent, or when it is located horizontally, and particularly when it is rotated at high speed, the bearings 33 will contact with the helical lining 35 of the casing and both the lining and the bearings, which have their convolutions inclined in the same direction, will bend and adjust themselves to the longitudinal curvature of the casing so that the engagement of the bearings 33 with the casing does not interfere with the free flexibility of the shafting. In practice, some lubricating material is inserted in the casing 15 at the upper end thereof to find its way along the length of the shaft and it is found that the presence of the bearings 33 which minimize the clearance between the shaft and the casing at intervals cause this lubricating material to collect at the points where the bearings are located, instead of at the lower end of the casing, so that effective lubrication is provided in the region of the bearings and the shaft may be maintained in operation for long periods of time without danger of injury to the bearings or intermediate portions of the shafting or the lining of the casing. When the grinding or polishing tool is of the suspended type shown in Fig. 2, there are ordinarily no large bends in the shafting except at the end thereof adjacent the grinding or polishing tool and in that case the bearings 33 may preferably be spaced relatively close together adjacent the tool 18$^a$ and may be spaced much farther apart or dispensed with entirely adjacent to the driving motor. Owing to the convenient method of applying these bearing members to the shaft and holding them in position thereon, additional bearings may be applied when desired and their relative spaced relation upon the shaft may be adjusted readily to suit the conditions under which the shaft is used. When the flexible shafting is employed as shown in Fig. 1, with the motor shown arranged horizontally and with some bending of the shafting occurring throughout its length, the bearings 33 are preferably spaced at intervals throughout the length of the shaft 30.

The use of these improved bearing members greatly reduces the noise and vibration of the shafting when in use in addition to increasing the life of the shaft and the casing and it is found that very greatly improved results are obtained with the use of this shafting as compared with those obtained from the operation of the various types of flexible shafting heretofore known.

Although one form of the improved flexible shafting of the present invention has been shown and described by way of illustration in connection with two examples of its use, it will be understood that the improved shafting may be constructed in various forms and used in various ways within the scope of the appended claims.

I claim:

1. A flexible shaft provided at spaced intervals with flexible bearing portions.

2. A flexible shaft having surrounding flexible helical bearing members mounted thereon at spaced intervals.

3. A flexible shaft embodying flexible outer metallic windings forming bearings spaced apart longitudinally thereof.

4. A flexible shaft provided with a surrounding helical flat wire flexible spring of relatively short length as compared with the length of the shaft held thereon by resilient pressure.

5. A flexible shaft comprising superimposed layers of wire wound in helical fashion upon each other and a surrounding helical coil of flat wire forming a relatively short flexible bearing rotatable with the shaft.

6. A flexible shaft provided with a surrounding flexible helical coil having a normal inner diameter less than the outer diameter of said shaft, said coil being expanded to enclose and grip a part of said shaft.

7. A flexible shaft provided with a plurality of flexible bearings held thereon by resilient pressure and relatively adjustable longitudinally of the shaft.

8. The combination in flexible shafting, of a flexible core, a flexible casing surrounding said core and having a flexible metallic lining, and flexible bearing members mounted at spaced intervals on said core and adapted to engage said lining.

9. The combination in flexible shafting, of a flexible core, a flexible casing surrounding said core and having a flexible metallic lining, and flexible bearing members mounted at spaced intervals on said core and adjustable longitudinally thereof.

10. The combination in flexible shafting, of a flexible core, a flexible casing surrounding said core, and a plurality of helical bearing members mounted at spaced intervals on said core.

11. The combination in flexible shafting, of a flexible core, a flexible casing surrounding said core, and a plurality of helical bearing members mounted at spaced intervals on said core and spaced normally from the inner surface of said casing.

12. The combination in flexible shafting, of a flexible core, a flexible casing having a helical metallic lining, and flexible helical bearing members mounted at spaced intervals on said core for engagement with said lining, said bearing members and said lining having their convolutions inclined in the same direction.

13. The combination in flexible shafting, of a flexible core, a flexible casing surrounding said core, and a plurality of flexible bearing members closely fitting said core and mounted thereon at intervals, said bearing members being adapted to contact with the interior of said casing.

14. The combination in flexible shafting of a flexible core, a flexible casing surrounding said core, and a flexible bearing comprising spaced flexible bearing sections mounted on and rotatable with said core within said casing.

15. The combination in flexible shafting of a flexible core, a flexible casing surrounding said core, and a flexible bearing comprising spaced flexible bearing sections mounted on and rotatable with said core and normally spaced from said casing.

16. A flexible shaft provided with a surrounding flexible bearing portion of relatively short length as compared with the length of said shaft and rotatable with said shaft.

17. A flexible shaft provided with spaced flexible helical bearing members mounted to rotate therewith.

HERMAN GOLDBERG.